United States Patent [19]  [11] 4,132,657
Verdicchio et al.  [45] Jan. 2, 1979

[54] TREATMENT OF METAL SURFACES

[75] Inventors: Robert J. Verdicchio, Succasunna, N.J.; Louis J. Nehmsmann, III, Ellicott City, Md.

[73] Assignee: GAF Corporation, New York, N.Y.

[21] Appl. No.: 719,518

[22] Filed: Sep. 1, 1976

Related U.S. Application Data

[63] Continuation-in-part of Ser. No. 557,043, Mar. 10, 1975, abandoned, which is a continuation of Ser. No. 349,649, Apr. 9, 1973, abandoned.

[51] Int. Cl.$^2$ .................. C10M 1/48; C07F 9/09
[52] U.S. Cl. ................... 252/32.5; 252/32.7 E; 252/33; 252/46.7; 252/49.9; 260/929
[58] Field of Search .......... 260/929; 252/32.5, 32.7 E, 252/33, 46.7, 49.9

[56] References Cited

U.S. PATENT DOCUMENTS 3,692,462  9/1972  Bach et al. ...................... 8/43

FOREIGN PATENT DOCUMENTS 813502  10/1974  Belgium.
2416018  10/1974  Fed. Rep. of Germany ........... 260/929
355457  8/1961  Switzerland ...................... 260/929
465200  4/1937  United Kingdom.

Primary Examiner—Anton H. Sutto
Attorney, Agent, or Firm—W. C. Kehm; A. Dresner; J. J. Ward

[57] ABSTRACT

Complex phosphate ester surfactants derived from a quaternary dihydroxy compound having the formula

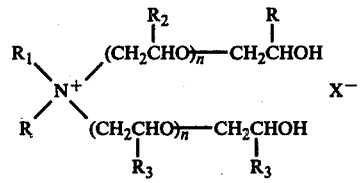

wherein R and $R_1$ represent the same or different alkyl moieties containing 1 to 22 carbon atoms, the sum of R and $R_1$ not being less than 7 carbon atoms; $R_2$ and $R_3$ each represent H or $CH_3$; n is an integer having an average value of from 1 to 50; X is an anion of halogen, sulfate, or alkyl sulfate; and wherein the resultant complex phosphate ester contains at least 1/3 P atom per mole of quaternary dihydroxy compound; can be made through reaction of such dihydroxy quaternary compound with a conventional phosphating agent such as $P_2O_5$, polyphosphoric acid, or $POCl_3$ to form interesting amphoteric surface active agents having utility as metal lubricants, heavy duty cleaners, detergents, etc.

7 Claims, No Drawings

TREATMENT OF METAL SURFACES

CROSS-REFERENCE TO RELATED APPLICATIONS

This is a continuation-in-part of application Ser. No. 557,043, filed Mar. 10, 1975, now abandoned, which, in turn, was a continuation of application Ser. No. 349,649, filed Apr. 9, 1973 and now abandoned.

BACKGROUND OF THE INVENTION

Field of the Invention

This invention relates to new amphoteric surfactants, and more particularly to specific ethyoxylated amines which are quaternized and at least partially phosphated; methods of making such surfactants; and to methods of using such surfactants. More particularly, this invention relates to novel complex phosphate surfactants that are derived from quaternary dihydroxy compounds of the formula

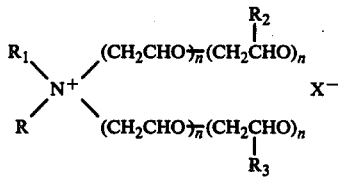

wherein R and $R_1$ represent the same or different alkyl moieties containing 1 to 22 carbon atoms, the sum of R and $R_1$ not being less than 7 carbon atoms; $R_2$ and $R_3$ each represent H or $CH_3$; n is an integer having an average value of from 1 to 50; X represents an anion of halogen, sulfate, or alkyl sulfate; and wherein the resultant complex phosphate ester contains at least $\frac{1}{3}$P atom per mole of quaternary dihydroxy compound; can be made through reaction (phosphating) of such dihydroxy quaternary compound with a conventional phosphating agent such as $P_2O_5$, polyphosphoric acid, or $POCl_3$ to form amphoteric surface active agents having utility as metal lubricants, heavy duty cleaners, detergents, etc.

In particular, the ultimate complex phosphate ester surfactants themselves, that are derived from phosphating in the manner discussed above, are compositions which are characterized by the following chemical formula or structure

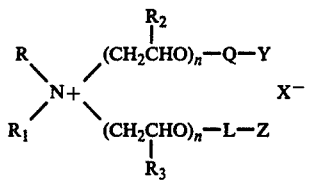

wherein R and $R_1$ represent the same or different alkyl moieties containing 1 to 22 carbon atoms, the sum of the total number of carbon atoms for R and $R_1$ not being less than 7; $R_2$ and $R_3$ each represent H or $CH_3$; n is an integer having an average value of from 1 to 50;

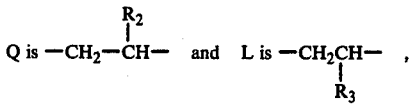

where $R_2$ and $R_3$ are as previously defined; Y is a moiety of OH,

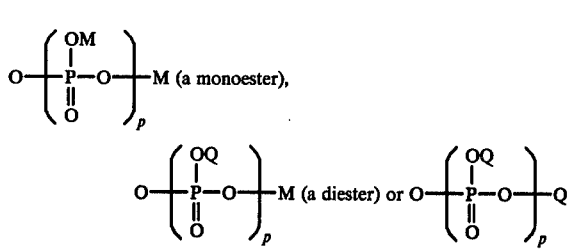

(a triester), p being an integer of at least 1, M being H or a metal cationic equivalent thereof such as that of Na or K and being as previously defined; Z is a moiety of OH,

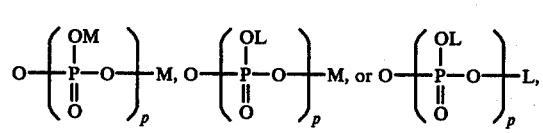

p being an integer of at least 1, M being a metal cationic equivalent thereof (e.g., Na or K) and L being as previously defined; and X is an anion such as, e.g., halogen, sulfate, or alkyl sulfate, etc. Of course, as would be appreciated by those skilled in the art, the diesters and triesters of the above formula can exist in a variety of forms, e.g., in the form of a variety of aliphatic, cyclic, and polymeric compounds. However, in accordance with the present invention, the major products formed comprise aliphatic monoesters and diesters.

Description of the Prior Art

The prior art describes many, and varied, types of amine phosphonates, phosphates, and related compounds. For example, various hydroxy alkyl and dihydroxyl alkyl derivatives of higher fatty acid amines have been phosphated, but none of these compounds have achieved significant commercial acceptance and in none have been found all of the desirable properties of the instant invention.

Considerable research has been carried out during the past few years directed towards improving the lubricating and rust and corrosive inhibiting properties of the new synthetic surfactant compositions. Most of these surfactant compositions have, as active surfactant ingredient, anionic ions. As representative of the various additives which have been employed for improving the detersive and surfactant properties of such anionic compositions, there may be mentioned alkali metal phosphates, borates, carbonates, sulfates, chlorides, silicates, higher aliphatic alcohols such as lauryl alcohol, and higher fatty acid amides and alkylol amides such as lauroyl amide, lauroyl mono and dialkyl amides, lauroyl ethanolamide, and lauroyl di-ethanolamide. The use of the aforementioned alkali metal salts, particularly the phosphates and borates, generally have resulted in what is known as built or heavy duty type detergents. While such compositions are partially suitable for use in cleaning machines of various types, they find limited use in applications wherein any degree of metal lubrication and cleaning is involved. However, these additives, which have thus far been more or less commercially accepted have properties and characteristics which still leave much to be desired with respect to characteristics such as more universal compatibility and adaptability to different conditions, cost and the like.

Various organic surfactants have achieved considerable commercial success; however, the art is still confronted by the problem of providing surfactant compositions which provide dual cationic and anionic functionalities and yet are free from undesirable disadvantages.

It has been found that the compositions according to the instant invention comprise very valuable surface-active agents which may be used either alone or admixed with other cationic, anionic or non-ionic surface active agents in the different fields as above referred to.

The instant compositions comprise a very valuable group of surface-active agents, known as amphoteric compounds, i.e., chemical agents containing both cationic and anionic groups in a single molecule, and therefore exhibit a high degree of stability and remarkable utility in concentrated electrolytic solutions. These compounds also show unusual chemical stability under prolonged contact with alkaline systems. Products made from the instant compounds have the following advantages: they possess good surface-active properties so that they can be used as detergents since they have the advantage of preventing the accumulation of electrostatic charges, are well tolerated by the skin and, therefore, do not cause any appreciable irritation thereto, are useful as lubricants, rust inhibitors, corrosion inhibitors, hard surface cleaners, alkali soluble cleaners, agriculture emulsifiers, hydraulic fluids, and in emulsion polymerization.

These amphoterics employ the phosphate ester as the anionic moiety, thereby in addition to providing dual cationic/anionic functionality, offer novel properties such as metal lubrication, and cleaning, enhanced corrosion inhibition and alkali solubility.

The novel compounds of this invention have the following unexpected combinations of properties: (1) they, unlike phosphates of ethoxylated amines, tolerate the presence of chlorine bleaches; (2) they may be used in shampoos and other cosmetics at pH values of 4.5–8.5 and under these conditions are effective cleaning agents whereas conventional counterparts to these materials do not work well under pH values of 6.0:conventional amphoterics such as betaines do not work at their isoelectric point (about pH 5.7) since they become insoluble at these pH values; (3) they are better detergents with average or hard water; do not precipitate; at pHs as low as 4.5 they are mild to the eyes and skin and they are relatively non-toxic. In addition, these products are readily biodegradable and as such are ecologically safe. The instant amphoteric compounds are useful as detergents, wetting, emulgating and emulsifying agents and also possess a unique combination of properties which will provide new and improved products for lubricants, pesticide emulsifiers, hard surface cleaners, etc. They are also useful as surface active agents in treating natural and synthetic fibers in the textile and related fields where they may be employed as synthetic detergents, dye assistants and softeners.

These amphoteric surfactants also show an advantage over the prior art and seemingly do not exhibit a pronounced isoelectric point where general surface-active and physical properties such as solubility, foaming, etc. are at a minimum.

SUMMARY OF THE INVENTION

It is an object of the instant invention to avoid one or more drawbacks of the prior art.

It is another object of the invention to provide an improved composition for the wet treatment of materials.

It is still another object of the invention to provide for amphoteric chemical compositions that may be used in aqueous solutions at acid neutral or alkaline pH. In the former, they serve as cationic surface-active agents; in the latter, as anionic surface-active agents.

It is still a further object of the invention to provide for new articles of manufacture, such as surface-active compositions, rust and corrosion inhibitors, hard surface cleaners, agricultural emulsifiers, pesticide emulsifiers, wetting agents, lubricants and fabric softeners.

These and other objects of the invention will become more apparent as the description proceeds.

DESCRIPTION OF THE PREFERRED EMBODIMENTS

As previously noted, the present complex phosphate surfactants are derived from quaternary dihydroxy compounds previously described above, and, as derived, are obtained in two major forms: (1) as monoesters, and (2) as diesters, with minor amounts of triesters (essentially as an impurity) being formed.

The cation M, as utilized herein and in the formula of the present amphoteric compounds set forth on page 3, represents H or a conventional cation such as: Na, K, Mg, Ca, Al, preferably Na or K, or a suitable amine such as an alkanol amine or alkylamine, preferably monoethanolamine, diethanolamine, or triethanolamine. The X moiety of the quaternary dihydroxy compound, when a halogen, may be chlorine, fluorine, bromine, or iodine and preferably chlorine. When a sulfate, X can be an alkyl sulfate, preferably ethyl sulfate. In the most preferred embodiment, R and $R_1$ are dissimilar, one being a long alkyl chain, the other being a shorter alkyl chain, the sum total of carbon atoms for R and $R_1$, taken together, not being less than 7 carbon atoms. Also disclosed are methods of making same and uses therefor.

From the above description, and as more fully described hereafter, it will be apparent that the preferred embodiment of this invention relates to a method comprising treating a metal surface with a metal-cleaning, -lubricating and -rust and -corrosion inhibiting composition containing an effective amount of an amphoteric surface active agent of the formula:

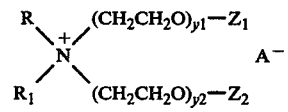

wherein R is $C_{6-22}$alkyl,
$R_1$ is $C_{1-2}$alkyl or benzyl,
$y_1$ and $y_2$ are each integers of 1–50,
$Z_1$ is, with the bonded O atom, a phosphate ester group in free acid form or in the form of its sodium, potassium, calcium or magnesium salt,
$Z_2$ is H or $Z_1$, and
A is a halogen, sulfate or $C_{1-2}$alkyl sulfate anion.

The novel compounds of the instant invention may be prepared from a precursor material by first condensing an alkyl amine, containing 6 to 22 carbon atoms in its alkyl chain, with an alkylene oxide (e.g. ethylene oxide or propylene oxide) in the presence of a conventional base. To produce the quaternized component, a quaternizing agent is added thereto and the alkoxylated amine is thereafter quaternized. The quaternized alkoxylated amine is thereafter phosphated so as to produce a quaternary phosphate. The phosphated amphoteric product is generally a mixture containing varying amounts of monophosphate, diphosphate, triphosphate, non-phosphated nonionic (alkoxylate), phosphoric acid, and minor amounts of other materials such as polymers of the foregoing phosphates.

The alkyl portion of the amine can be replaced by equivalent unsaturated moieties, i.e., alkenyl groups. A pure source of alkyl amine to be employed can vary in carbon length from 6 to 22 carbon atoms; examples of pure saturated acids which can be used as precursors for such an amine are caproic, caprylic, capric, lauric, myristic, palmitic, stearic, arachidic, and behenic. Unsaturated pure fatty acid precursors include those such as oleic, lauroleic, palmitoleic and ricinoleic. Mixtures of the above fatty acids, commonly found in vegetable oils, animal fats and oils, and the marine fats and oils, may also be used successfully as precursors. Examples of vegetable sources of useful precursor fatty acids containing mixtures in various proportions are coconut oil, linseed oil, olive oil, palm oil, peanut oil, tung oil, and rape seed oil. Animal and marine sources of fatty acids containing saturated and unsaturated fatty acid substituents are lard, tallow, and sardine oil. Any fatty acid or mixtures of fatty acids whether pure or from impure sources may be employed as an amine precursor without departing from the spirit of the invention so long as they contain from 6 to 22 carbon atoms in their chain length.

Preferred fatty acids are those contained in coconut vegetable oil. A typical coconut vegetable oil may contain fatty acids varying in length from 8 to 18 carbon atoms. These fatty acids from coconut oil can be saturated or unsaturated.

The alkyl amines used in this invention can also be derived from the esters of the fatty acids without departing from the scope of the invention. The methyl or ethyl esters of the fatty acids can be easily condensed with the polyamines of substituted polyamines with ready removal of methanol or ethanol occurring.

The fatty acid amine precursor is prepared in accordance with procedures well known in the art and, accordingly, that reaction and reaction product per se, form no part of the instant invention.

The thus-produced alkyl amine is then subjected to an alkoxylation reaction in accordance with procedures well known in the art, such as, for example, by reacting the amine with the required number of moles of ethylene oxide to produce the ethyoxylated amine employed in the instant invention. This oxyethylation reaction is well known in the art and fully described in U.S. Pat. No. 1,970,578 and in many other patents. The reaction is preferably carried out at elevated temperatures and pressures, and may be catalyzed by quaternary hydroxides, amines, acids and/or coordinating type compounds, although strong alkaline catalysts such as KOH or NaOH and the like are preferred because of the fewer by-products formed and the more easily controllable reaction conditions under which they can react.

Since the reaction is substantially quantitative, the molecular proportions of the ethylene oxide and amine employed determine the average oxyethylene chain length of the resulting ethoxylated amine, although it will be understood that the product is a mixture of ethoxylated amines of varying oxyethylene chain length. As stated above, sufficient ethylene oxide is employed to produce an ethoxylated amine containing by weight about 25 to 90 percent of combined ethylene oxide. The optimum oxyethylene chain length will in any particular instance be determined mainly by the particular amine being oxyethylated, the particular detergent with which it is to be admixed, the hardness of the water in which the detergent is to be employed, the desired efficacy of the finished product for the particular application, and the like.

Throughout the specification, the invention is described with reference to the phosphated quaternized alkoxylated amine. It is to be understood, however, that the amine as well as the alkoxylated amine are products known in the art. The alkoxylated amine may be used per se or the amine may be alkoxylated in accordance with procedures well known in the art.

The product of the invention is then conveniently prepared by reacting appropriate proportions of alkoxylated monoalkyl amine in the presence of said hypophosphorous acid and a quaternizing agent, such as diethylsulfate, the latter being present in the amount of 50 to 100 mole %, preferably 90 to 100 mole %.

The alkoxylated monoalkyl amine starting materials prepared by alkoxylating primary amines, have the general structure

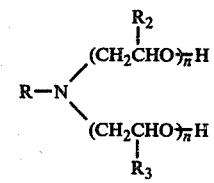

wherein $R_2$ and $R_3$ are H or $CH_3$ as above described and n is a positive integer having an average value of from 1–50, compounds with $n=2$ to 15 being preferred.

After completion of the reaction, the alkoxylated monoalkyl amine is thereafter submitted to treatment conducive to quaternization of the tertiary amino group, utilizing a conventional quaternizing agent. Thus, noting the above structural formula, suitable quaternizing agents include: dialkyl sulfates, e.g., dimethyl sulfate, diethyl sulfate, etc.; benzyl or substituted benzyl halides, e.g. benzyl chloride, benzyl bromide, benzyl iodide, etc.; alkyl halides, e.g. methyl chloride, etc. Accordingly, any conventional quaternizing agent can be advantageously employed in the production of the quaternary alkoxylated monoalkyl amines used herein.

The above quaternized composition is then preferably but not necessarily stipped of any unreacted quaternizing agent and thereafter reacted with a phosphating agent so as to convert the quaternized alkoxylated monoalkyl amine into a quaternized phosphate ester product. Suitable phosphating agents include phosphorus pentoxide; polyphosphoric acid; phosphorus oxychloride; mixtures thereof; and the like.

In accordance with a preferred procedure of the present invention, the alkoxylated fatty amine and polyphosphoric acid are mixed together and heated to about 90°-100° C. under vacuum. The product thereof is thereafter cooled to 20° to 90° C., preferably to 30° C., and thereto there is added 50 to 100 mole %, preferably 90 to 100 mole %, of a quaternizing agent, and the mixture is thereafter heated so as to effect quaternization of the alkoxylated fatty acid amine. Any unreacted quaternizing agent may be stripped away at elevated temperature and under vacuum. The remaining product is thereafter cooled and there is slowly added thereto the phosphating agent in amounts of 10 to 200 mole %, preferably 90 to 110 mole %, at temperatures of 20° to 110° C., preferably 40° to 50° C. If phosphorus oxychloride acid is used as the phosphating agent, the reaction mixture is bubbled with nitrogen at such temperature until a desired degree of chloride ion is reached, preferably 0.01 to 1.0%. The phosphorus oxychloride reaction product is then drowned into water and base and there is thereafter obtained the surfactant solution containing the instant product.

The invention is further described with reference to the following representative compositions and process for manufacture of the same; the examples are not, however, intended to limit the generally broad scope of the invention.

The nature of the invention may perhaps be best understood by the detailed procedure set forth in the examples herebelow for preparing a typical member of the phosphated quaternized ethoxylated amphoterics; all parts, proportions and percentages in these examples, as well as in the appended claims, are by weight unless indicated otherwise. Ethylene oxide throughout these examples is referred to as "EO".

EXAMPLE I

Charge into a 1-liter flask equipped with an agitator, thermometer and gas inlet, 320 parts (0.5 mole) of cocoamine + 10EO and 2 parts of 50% hypophosphorous acid. Dry the mixture under vacuum (10-15 mm.) at 80°-100° C. Cool under dry nitrogen to 40°-50° C. and add 80 parts (0.52 mole) of diethyl sulfate at 40°-50° C. over two hours.

Strip any unreacted diethyl sulfate at 90°-100° C. under good vacuum. Cool to 30°-40° C., and, under a nitrogen blanket, add 35.5 parts of phosphorus pentoxide and stir at 100° C. for 5 hours. Cool to 80°-85° C., add 5 parts water, and stir for 2 hours. There is obtained 433 parts of active surfactant. This represents a 99% yield.

EXAMPLE II

Operating as in Example I, 460 parts (0.4 mole) of tallowamine (Armeen-TD- a distilled tallow amine made by and available from Armak) + 20EO and 2 parts of 50% hypophosphorous acid are charged to a 1-liter flask. The mixture is dried at 90°-100° C. under a good vacuum, cooled to 30°-40° C., and 60 parts of diethyl sulfate are added over 2 hours. The mixture of quaternized amine ethoxylate is phosphated in the following manner. Hypophosphorous acid (50%) 1 part, is added at 40-50° C. followed by 29 parts of phosphorus pentoxide at 50-60° C. The mixture is heated to 100° C. for 5 hours under a nitrogen blanket, cooled to 80°-85° C., and 5 parts water are added. The system is stirred for 2 hours at 80°-85° C. There is obtained 553 parts of 100% active surfactant.

EXAMPLE III

According to Example I, 460 parts of tallowamine + 20EO, 2 parts of 50% hypophosphorous acid and 60 parts of diethyl sulfate are reacted to form 520 parts of quaternized tallowamine + 20EO. To this mixture, 1 part 50% hypophosphorous acid is added at 40°-60° C., followed by 170 parts of 115% polyphosphoric acid at 40°-60° C. under a nitrogen blanket. The phosphating mixture is heated at 100° C. for 5 hours, then cooled to 80°-85° C., and 5 parts of water are added. After two hours at 80°-85° C., 1 part of 35% hydrogen peroxide is added to yield 697 parts of 100% active surfactant.

EXAMPLE IV

As in Example I, 586 parts of oleylamine + 7EO and 2 parts of 50% hypophosphorous acid are dried and reacted with 286 parts of oleyl chloride at 60°-70° C. for 10 hours. The quaternized amine ethoxylate mixture is mixed with 1 part 50% hypophosphorous acid and 28 parts water. Phosphorus pentoxide, 142 parts, is added slowly under a nitrogen blanket at 40°-50° C. over 2 hours. The reaction mixture is heated for 3 hours at 90° C., and then 5 parts of water are added. The resulting surfactant is heated an additional 2 hours at 80°-90° C., cooled to 60° C., and then 1 part 35% hydrogen peroxide is added. There is obtained 1,042 parts of surfactant.

EXAMPLE V

As in Example I, 708 parts of stearyl amine + 10EO, 2 parts of 50% hypophosphorous acid and 126 parts of benzyl chloride are reacted at 70°-80° C. to form the quaternized amine ethoxylate. This material is then reacted with 75 parts of phosphorus oxychloride at 40°-50° C. over 4 hours. The hydrogen chloride is removed by nitrogen bubbling to a constant chloride ion content. The phosphated acid mixture was drowned into 120 parts of 50% caustic soda, to obtain 980 parts of surfactant solution.

EXAMPLE VI

The following surfactant compositions can be employed for different end uses, specified below, in accordance with the following table, Table 1, wherein all parts mentioned are defined in terms of weight %.

TABLE 1

|  | Liquid Drain Cleaner | Steam Degreaser | Hard Surface Cleaner |
|---|---|---|---|
| Phosphate ester amphoteric of Example I | 1.0 | 1.0 | 1.0 |
| NaOH | 9.0 | 17.0 | 2.0 |
| TKPP | — | — | 10.0 |
| Water | 90.0 | 82.0 | 87.0 |
| Totals | 100.0 | 100.0 | 100.0 |

EXAMPLES VII-XII

The present compounds are also applicable as alkaline hard surface cleaners, exhibiting excellent caustic stability depending upon the degree of ethoxylation, anionic functionality, and hydrophobe. Alkali solubility is shown in Table 2.

TABLE 2

Caustic Solubility - 1% Surfactant Soluble From 0 to 100° C In (x) % NaOH

| Example No. | COMPOUND | % NaOH |
|---|---|---|
| 7 | Sodium Phosphate of Cocoamine + 5EO diethyl sulfate | 9.4 |
| 8 | Sodium Phosphate of Cocoamine + 10EO diethyl sulfate | 6.6 |
| 9 | Sodium Phosphate of Cocoamine + 15EO diethyl sulfate | 4.9 |
| 10 | Sodium Phosphate of Cocoamine + 20EO diethyl sulfate | 4.25 |
| 11 | Sodium Phosphate of Cocoamine + 30EO diethyl sulfate | 3.2 |
| 12 | Sodium Phosphate of Cocoamine + 50EO diethyl sulfate | 2.4 |

EXAMPLE XIII

Fabric softeners and detergent/softeners and sanitizers can be prepared for use on textiles, and Table 3 below sets forth typical formulations (wherein all ingredients are in parts by weight %) for such purposes:

TABLE 3

|  | 1 | 2 | 3 |
|---|---|---|---|
| Present amphoteric surfactant | 3–7 | 10–30 | 10–30 |
| Distearyl dimethyl ammonium halide | — | 3–7 | 3–7 |
| (n-alkyl dimethyl benzyl ammonium halide | — | — | 5–10 |
| Sodium acetate | 1–2 | — | — |
| Water | to 100% | to 100% | to 100% |

EXAMPLE XIV

This example is intended to show that the present surfactants can be effectively employed in textile softening compositions. In this example, 5 parts by weight of the present amphoteric surfactant in 95 parts by weight of water are neutralized with sodium hydroxide to a pH of 5.5. This solution, as noted, is a very efficient softener/antistatic agent for textiles.

In a typical application, the solution is diluted 1:10 with distilled water.

Conventional textile fabric substrates are then treated with the dilute surfactant solution during conventional padding of such substrates. The fabrics thus softened show excellent softness, i.e., pliable to feel, and complete elimination of static electricity upon drying.

The advantage of this softener over conventional cationic softeners is that it can be washed out during subsequent laundering, whereas the cationic softeners tend to build up over repeated applications.

EXAMPLE XV

In this example there were prepared, according to the procedure of Example I (except for the identity and amount of amine reactant used), (a) the sodium phosphate of tallowamine + 5EO diethyl sulfate and (b) the sodium phosphate of oleylamine + 5EO diethyl sulfate. With respect to (a) 240 parts by weight (0.5 mole) of tallowamine + 5EO (Ethomeen T/15 of Armak) was used (instead of the 0.5 mole of cocoamine + 10EO of Example I), and, with respect to (b), 250 parts (0.5 mole) of oleylamine + 5EO (Ethomeen O/15 of Armak) was used (instead of the 0.5 mole of cocoamine + 10EO of Example I).

Then, 0.4% aqueous solutions of (a) and (b) were prepared, their pH values were adjusted to pH 8.5 with triethanolamine, and the pH-adjusted solutions evaluated for use as water-based lubricants. The Falex Load Test was used to determine the lubricating properties of the respective solutions, and the following results, set forth below in Table 4, were obtained.

TABLE 4

| Sample | Load at Failure |
|---|---|
| (1) 0.4% aq. sodium phosphate of tallowamine + 5EO diethyl sulfate | 4,000 lbs. |
| (2) 0.4% aq. sodium phosphate of oleylamine + 5EO diethyl sulfate | 4,250 lbs. |
| (3) Water (control) | 550 lbs. |

These results indicate excellent lubricant properties.

The products of the instant invention may also be further compounded with other ingredients to provide for the following uses:

Liquid steam cleaning compounds, floor maintenance products, wax removers, automobile care products, waterless hand cleaners, oil tank degreaser, aluminum cleaner, hand washing compound, sanitizing hand dishwashing or light duty cleaning compound, pet shampoos, rug and upholstery shampoos, mothproofing, and the like.

It is obvious that numerous changes and modifications can be made in the invention without departing from the spirit and scope thereof, and all such obvious modifications are considered to be within the scope of the invention.

For example, in a preferred embodiment of this invention, it has been previously stated that the desired end products comprise mainly a monoester product and a diester product. As would be apparent to those skilled in the art, in view of the foregoing description of this invention, the monoester product would be obtained predominately when about 2.0 moles of phosphating agent were used per mole of quaternary alkoxylated monoalkyl amine. Alternatively, the diester product would tend to be the major product when about 1.0 moles of phosphating agent were used per mole of quaternary alkoxylated monoalkyl amine. And likewise, the triester product would tend to be the major product when about 0.5 mole of phosphating agent was used per mole of quaternary alkoxylated monoalkyl amine. As one used an increasing excess of phosphating agent beyond about 2.0 moles of phosphating agent, it would be apparent to those skilled in the art that correspondingly increased polymerization product would result. Thus, it can be seen that obtainment of the numerous, varied types of phosphated amphoteric product mixtures that are possible with the practice of this invention can vary considerably within the scope of this invention, as, e.g., with the amounts of phosphating and oxyalkylating agents used, but all this would represent mere routine experimentation by and to those skilled in the art.

We claim:

1. A method comprising treating a steel surface with a lubricating composition containing an effective lubricating amount of an amphoteric surface active agent of the formula:

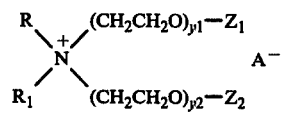

wherein R is $C_{6-22}$alkyl,
$R_1$ is $C_{1-2}$alkyl or benzyl, $y_1$ and $y_2$ are each integers of 1–50, $Z_1$ is, with the bonded O atom, a phosphate ester group in free acid form or in the form of its sodium, potassium, calcium or magnesium salt, $Z_2$ is H or $Z_1$, and A is a halogen, sulfate or $C_{1-2}$alkyl sulfate anion.

2. A method as defined in claim 1 in which $Z_1$ is in the form of the Na salt.

3. A method as defined in claim 1 wherein the sum of $y_1$ and $y_2$ is 5-50.

4. A method as defined in claim 1 wherein R is derived from cocoamine.

5. A method as defined in claim 1 wherein R is derived from tallowamine.

6. A method as defined in claim 1 wherein R is derived from oleylamine.

7. A method as defined in claim 1 wherein R is derived from stearylamine.